United States Patent
Turner et al.

(10) Patent No.: US 6,221,530 B1
(45) Date of Patent: Apr. 24, 2001

(54) MERCURY-FREE ZINC ANODE FOR ELECTROMECHANICAL CELL AND METHOD FOR MAKING SAME

(75) Inventors: Chris A. Turner, Cary, NC (US); David Cady, Lilburn, GA (US)

(73) Assignee: AER Energy Resources, Inc., Smyrna, GA (US)

( * ) Notice: Subject to any disclaimer, the term of this patent is extended or adjusted under 35 U.S.C. 154(b) by 0 days.

(21) Appl. No.: 09/198,663

(22) Filed: Nov. 23, 1998

Related U.S. Application Data

(63) Continuation-in-part of application No. 08/771,864, filed on Dec. 23, 1996, now abandoned.

(51) Int. Cl.⁷ .................. H01M 4/42; B32B 3/10
(52) U.S. Cl. .................. 429/229; 429/206; 205/64; 427/123; 427/376.8; 428/658
(58) Field of Search .................. 429/27, 206, 207, 429/229, 231; 205/64; 427/123, 376.8; 428/658

(56) References Cited

U.S. PATENT DOCUMENTS

| | | | |
|---|---|---|---|
| 2,880,258 | * 3/1959 | Pucher et al. | 427/123 |
| 2,982,705 | 5/1961 | Sakano et al. | 204/148 |
| 3,026,365 | 3/1962 | Hughes et al. | 136/100 |
| 3,977,901 | 8/1976 | Buzzelli | 136/86 |
| 4,088,803 | * 5/1978 | Kubo et al. | 427/123 |
| 4,118,551 | 10/1978 | Chireau et al. | 429/207 |
| 4,144,382 | 3/1979 | Takeda et al. | 429/91 |
| 4,376,810 | 3/1983 | Takeda et al. | 429/90 |
| 4,500,614 | 2/1985 | Nagamine et al. | 429/206 |
| 4,585,716 | 4/1986 | Chalilpoyil et al. | 429/206 |
| 4,735,876 | 4/1988 | Miura et al. | 429/206 |
| 4,743,185 | 5/1988 | Vu et al. | 419/23 |
| 4,812,374 | 3/1989 | Kagawa et al. | 429/50 |
| 4,861,688 | 8/1989 | Miura et al. | 429/206 |
| 4,957,826 | 9/1990 | Cheiky | 429/27 |
| 4,994,333 | 2/1991 | Jose et al. | 429/190 |
| 5,128,222 | 7/1992 | Yoshizawa et al. | 429/190 |
| 5,168,018 | 12/1992 | Yoshizawa et al. | 429/190 |
| 5,198,315 | 3/1993 | Tada et al. | 429/209 |
| 5,209,995 | 5/1993 | Tada et al. | 429/229 |
| 5,232,798 | 8/1993 | Goldstein et al. | 429/229 |
| 5,279,905 | 1/1994 | Mansfield, Jr. et al. | 429/27 |
| 5,306,579 | 4/1994 | Shepard, Jr. et al. | 429/40 |
| 5,306,580 | 4/1994 | Mansfield, Jr. et al. | 429/175 |
| 5,328,777 | 7/1994 | Bentz et al. | 429/27 |
| 5,364,715 | 11/1994 | Getz et al. | 429/229 |
| 5,376,480 | 12/1994 | Shinoda et al. | 429/229 |
| 5,378,329 | 1/1995 | Goldstein et al. | 204/115 |
| 5,382,482 | 1/1995 | Suga et al. | 429/206 |
| 5,464,709 | * 11/1995 | Getz et al. | 429/229 |
| 5,489,493 | 2/1996 | Urry | 429/224 |
| 5,506,067 | 4/1996 | Tinker | 429/27 |
| 5,541,021 | 7/1996 | Watanabe et al. | 429/206 |
| 5,569,551 | 10/1996 | Pedicini et al. | 429/27 |
| 5,733,677 | * 3/1998 | Golovin et al. | 429/27 |

FOREIGN PATENT DOCUMENTS

| | | |
|---|---|---|
| 0 457 354 | 11/1991 | (EP). |
| 0 700 104 | 3/1996 | (EP). |
| 2 634 594 | 1/1990 | (FR). |
| 59-30550 | 2/1984 | (JP). |
| 59-30561 | 2/1984 | (JP). |
| 01 319261 | 12/1989 | (JP). |

* cited by examiner

Primary Examiner—Stephen Kalafut
(74) Attorney, Agent, or Firm—Alston & Bird LLP

(57) ABSTRACT

An anode for use in an electrochemical cell comprises a plate of non-particulate, mercury-free zinc metal and a coating of indium metal on at least a portion of the zinc plate surface. The anode is particularly useful in a rechargeable metal-air cell. The elimination of mercury enhances the safety of the cell and the indium coating reduces gassing at the anode and corrosion of the anode. Desirably, the electrolyte in the metal air cell also includes indium hydroxide. Also, a method for making the anode using a hot-plate joining process.

55 Claims, 2 Drawing Sheets

MERCURY-FREE ZINC ANODE FOR ELECTROMECHANICAL CELL AND METHOD FOR MAKING SAME

CROSS REFERENCE TO RELATED APPLICATIONS

This application is a continuation-in-part application of U.S. Ser. No. 08/771,864, filed Dec. 23, 1996, now abandoned.

TECHNICAL FIELD

The present invention relates to electrochemical cells and methods for making these cells. More particularly the present invention relates to zinc-air electrochemical cells and zinc anodes for use therein and hot plate methods for forming these cells and anodes.

BACKGROUND OF THE INVENTION

Metal-air electrochemical cells utilize oxygen from ambient air as a reactant in an electrochemical reaction to provide a relatively lightweight power supply. Generally described, a metal-air cell includes an air-permeable cathode and a metallic anode separated by an aqueous electrolyte. During operation of a zinc-air cell, for example, oxygen from the ambient air is converted at the cathode to hydroxide ions, zinc is oxidized at the anode and reacts with hydroxide ions, and water and electrons are released to provide electrical energy.

Cells that are useful for only a single discharge cycle are called primary cells, and cells that are rechargeable and useful for multiple discharge cycles are called secondary cells. An electrically rechargeable metal-air cell is recharged by applying voltage between the anode and the cathode of the cell and reversing the electrochemical reaction. During recharging, the cell discharges oxygen to the atmosphere through the air-permeable cathode and the anode is electrolytically reformed by reducing to the base metal, the metal oxides formed during discharge.

Metal-air cell anodes are made from metals which can be oxidized during discharge in a metal-air cell to produce electrical energy. Such metals include lead, zinc, iron, cadmium, aluminum, and magnesium. Zinc is normally preferred because of the availability, energy density, safety, and relatively low cost of zinc. One problem with using zinc as the anode in a metal-air cell, however, is that zinc tends to corrode in the cell and produce gas. Excessive gassing at the anode produces pressure within the anode and can cause the cell to rupture. Mercury is added to the zinc to alleviate the problem of gassing at the anode. In other words, the zinc is amalgamated. The addition of mercury increases the cycle life of the cell by reducing the gassing at the anode. A serious problem with mercury, however, is that mercury is very toxic.

Indium has been used as a non-toxic substitute for mercury in zinc anodes. Typically, indium is added to zinc to form an alloy and the alloy is melted and blown to form a zinc-indium powder. Alternatively, the zinc can be formed as a powder and then coated with indium to form an indium coated zinc powder. The zinc/indium powder is then used to form an anode by either mixing the powder with a gel to form a gel-type zinc anode or pressing and sintering the powder into a cake.

Zinc powder gel anodes made with zinc powder are effective and have been used successfully, but there are some drawbacks. For example, it is desirable to have an anode which is uniform in thickness, density and porosity. This is desirable so that the anode discharges uniformly and efficiently and remains conductive across substantially the entire anode surface. Areas of an anode which are thicker, more dense, or less porous will discharge more slowly and can become inactivated by passivation. Passivated areas have reduced conductivity and the recharge efficiency of the anode is diminished.

The particle size and particle size distribution of zinc powder particles affect the density and porosity of the anode. Zinc powder often has a non-uniform particle size distribution, and as a result, relatively fine zinc particles tend to collect together and form densified, low porosity areas. In addition, zinc powder anodes are typically made by combining the zinc powder with binder material, polymer fibers, and electrolyte, and pasting the slurry to form a cake or gel. Care must be taken to thoroughly mix these materials so that the concentration of each ingredient is uniform across the anode. Some ingredients such as polymer fibers, tend to collect together during mixing and result in an anode with non-uniform density and porosity. Furthermore, the powder anode is usually formed with a tool such as a doctor blade which has limited precision and often results in an anode of uneven thickness. As a result, zinc powder anodes are often non-uniform and have a limited cycle life.

Non-particulate metal plate zinc forms an anode which is more uniform in thickness, density, and content; however, zinc/indium alloy can not be formed into solid plate as the indium goes to the grain boundaries of the zinc and will not allow it to be extruded into solid plate. In addition, zinc plate which is not amalgamated passivates during the initial discharge in a metal-air cell, discharges at an inadequate current density, and suffers a permanent loss in zinc capacity. This problem is not as serious for zinc powder anodes because zinc powder anodes have a higher surface area than zinc plate. However, to prevent the gassing and corrosion problems, these zinc powder anodes, as discussed above, use mercury.

These anodes are generally made using an ultrasonic welding process wherein a zinc portion of the anode and a current collector, usually made from silver, are bonded through ultrasonic welds. However, better contact between the zinc and the silver is desired than is achieved with this method. Additionally, the welded spots are inactive, thereby reducing the capacity of the anode.

Accordingly, there remains a need for a mercury-free zinc anode with uniform thickness, density and porosity, reduced gassing and corrosion at the anode and enhanced cycle life. Additionally, there exists a need for a method of forming an electrode which creates good contact between the anode and the current collector while eliminating dead spots within the anode.

SUMMARY OF THE INVENTION

The above-described needs are met by providing an anode comprising a plate of non-particulate, mercury-free zinc metal, a coating of indium metal on at least a portion of the zinc plate surface, and a current collector in electrical contact with the zinc plate. In an electrochemical cell, the indium coating inhibits corrosion of the zinc and gassing at the anode. The zinc plate, however, does not include a zinc/indium alloy and provides an anode with uniform thickness, density, and porosity.

The present invention also encompasses a rechargeable metal-air electrochemical cell including the above-described indium coated anode disposed in a case along with an air cathode and an aqueous liquid electrolyte. The case has an opening for receiving and releasing gas through the case and the air cathode is disposed in the case adjacent the opening. The aqueous liquid electrolyte contacts the air cathode and the anode.

The present invention further encompasses a process for making a zinc anode comprising the steps of discharging the above-described indium coated zinc plate anode in an electrochemical cell and electrically recharging the zinc anode. The undischarged indium coated zinc plate anode is discharged in the cell to form a discharged anode and then electrically recharged in the cell so that the discharge anode is reformed as a porous cake comprising zinc particles and indium metal dispersed in the cake. The resulting coated plate resists corrosion and gassing in the electrochemical cell and has a substantially uniform thickness, density, and porosity. Additionally, a hot-plate system is used to join the indium-coated zinc plate with a current collector to form the anode.

The zinc plate which forms part of the anode desirably is perforated and more desirably is a sheet of expanded perforated metal. Preferably, the indium is coated on the zinc metal plate by electroless immersion plating. The indium is desirably present in the anode in an amount from about 500 to about 1500 parts per million parts zinc.

In the electrochemical cell, the electrolyte desirably includes indium ions. A suitable compound for providing the indium ions is indium hydroxide. The electrolyte also preferably comprises a Group I metal hydroxide. The indium ions are desirably present in the electrolyte in an amount from about 500 to about 1000 parts per million parts Group I metal oxide. The indium ions and the electrolyte further inhibit corrosion of the anode and gassing at the anode and enhance the cycle life of the cell.

Accordingly, an object of the present invention is to provide an improved mercury-free zinc anode for use in an electrochemical cell.

Another object of the present invention is to provide an improved mercury-free zinc-air electrochemical cell.

Still another object of the present invention is to provide a mercury-free zinc-air cell with reduced corrosion and gassing at the anode and enhanced cycle life.

Still another object of the present invention is to provide a mercury-free zinc-air cell with good contact between the indium-coated zinc plate and the current collector.

Other objects, features, and advantages of the present invention will become apparent from the following detailed description, drawings, and claims.

DETAILED DESCRIPTION OF DRAWINGS

As summarized above, the present invention encompasses a mercury-free zinc anode, an electrochemical cell, such as a metal-air cell, comprising a mercury-free zinc anode, and a method for making the anode. An embodiment of this invention is described in detail below.

Figure 1:
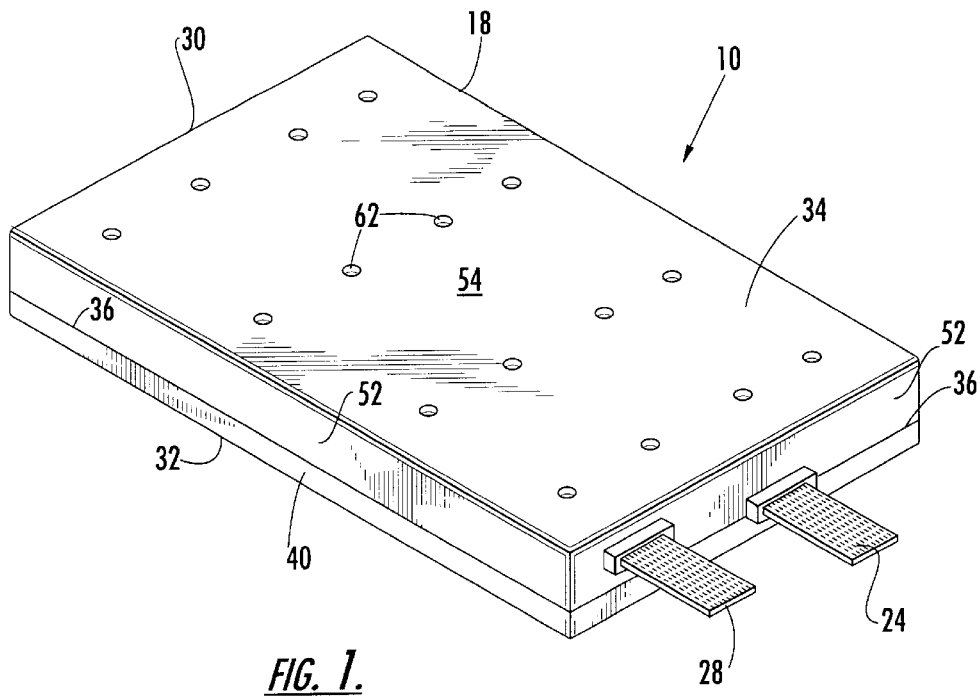
FIG. 1 is a perspective view of a metal-air cell made in accordance with an embodiment of the present invention.
Figure 2:
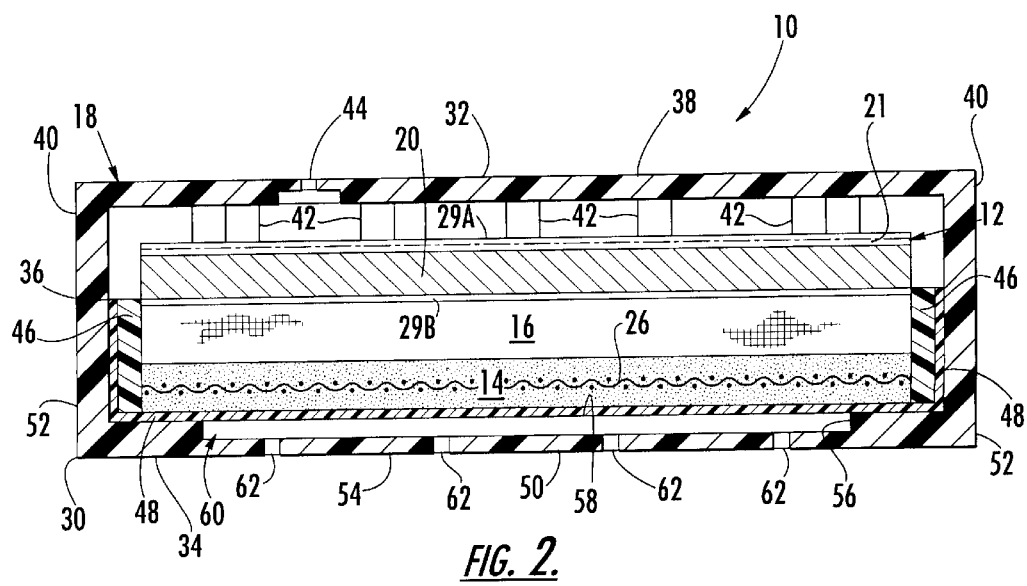
FIG. 2 is a partial, sectional, elevation view of the metal-air cell shown in FIG. 1 with the anode undischarged.
Figure 3:
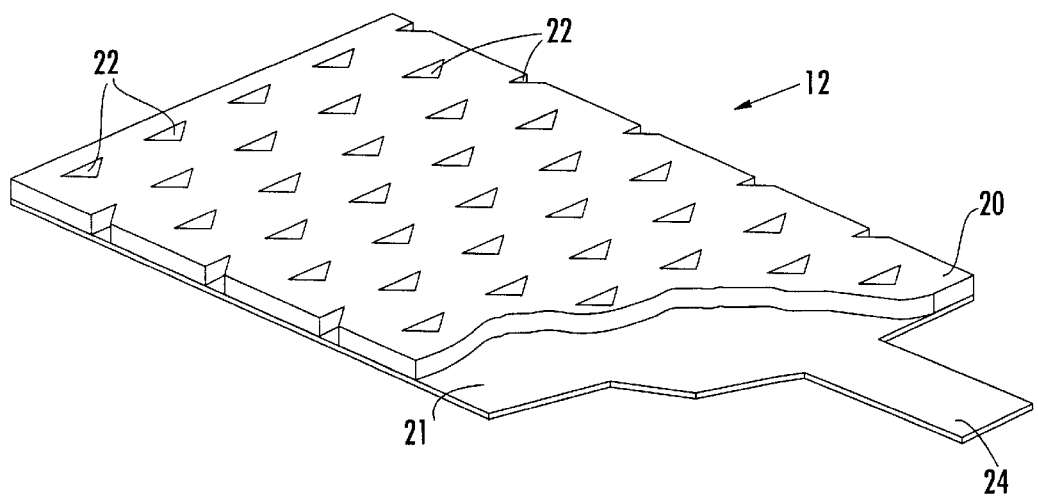
FIG. 3 is a partial perspective view of the anode in the metal-air cell shown in FIG. 1.
Figure 4:
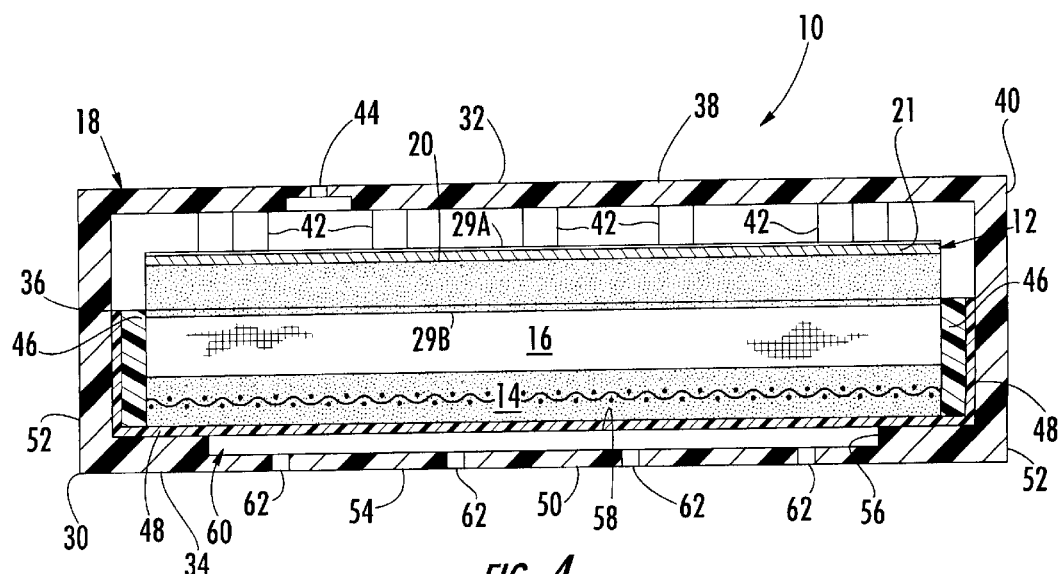
FIG. 4 is a partial, sectional, elevation view of the metal-air cell shown in FIG. 1 with the anode having been discharged and recharged.

A metal-air cell 10 is shown in FIGS. 1, 2 and 4 and generally comprises an anode 12, an air cathode 14, a separator 16, and an electrolyte disposed in a cell case 18. In FIG. 1, the cell 10 is oriented so that the cathode 14 is above the anode 12. In FIG. 2, the cell 10 is inverted so that the anode 12 is above the cathode 14. During normal operation, the cell is desirably oriented so that the anode 12 is above the cathode 14.

The anode 12 comprises a non-particulate metal zinc plate 20 and a silver foil current collector 21 attached to the zinc plate by a hot-plate welding process described in more detail below. The zinc plate 20 is coated with indium by an electroless immersion plating process described in more detail below.

The zinc plate 20 is made of non-particulate, mercury-free zinc. The term "mercury-free" means that the total amount of mercury present in the anode is an amount which does not result in a harmful amount of environmental pollution when it is disposed. Desirably, the anode 12 of this invention has less than 50 parts of mercury per million parts of zinc. More desirably, there is zero-added mercury to the cell. The term "zero-added" means that no mercury is added to the zinc which forms the zinc plate 20. Typically, a residual amount of mercury is naturally present in zinc. Most desirably, the mercury which forms the zinc plate 20 has less than 3 parts mercury per million parts zinc.

The zinc plate 20 of the anode 12 has a plurality of perforations 22 therein to increase the surface area of the zinc plate. The increased surface area increases the rate of discharge of the anode 12 during the first discharge cycle. Desirably, the zinc plate 20 is an expanded perforated zinc metal plate made by passing a non-perforated zinc plate through a pair of rollers having meshing teeth which form a series of perforations and projections in the plate. The surface area of the zinc plate 20 can also be increased by forming recesses in the zinc plates. The perforations, projections, and recesses can be formed by a variety of methods including the above-described method of perforating and expanding and also punching, direct forming, etching, shot peening, sandblasting, knurling, and the like.

The zinc plate 20 has a surface which is substantially entirely coated with indium metal. Desirably, the indium is present on the zinc plate 20 in an amount from about 500 to about 1500 parts of indium per million parts zinc. If the indium is present in amount of less than about 500 parts per million parts zinc, initial discharge of the anode 12 results in passivation and hydrogen gassing at the anode during discharge is excessive. If the indium is present on the zinc plate 20 in an amount greater than about 1500 parts per million parts zinc, there is a negative impact on electrochemical cell cycle life without further reduction in hydrogen gassing. Most desirably, the indium is present on the zinc plate 20 in an amount from about 500 to about 1000 parts indium per million parts zinc.

Before coating the zinc plate 20 with indium, the zinc plate is cleaned to a bright finish. The zinc plate 20 is formed from coiled zinc plate. The zinc plate is pulled from the coil through a system of brushes to remove zinc oxide from the surface of the zinc plate. Suitable cleaning brushes are aluminum oxide or silicone oxide bristle brushes, such as SCOTCHBRITE 7A aluminum oxide bristle brush available from 3M Corporation, of St. Paul, Minn. The zinc plate is brushed evenly to a bright finish so that subsequent indium coating is applied evenly. For a one volt cell, the zinc plates preferably are 6×11 cm, but can be any size. The brushed panels are first cleaned by immersing in a methanol cleaning solution. Then, the panels are submerged in an ultrasonic bath heated to approximately 70 to 80° C. The cleaning bath comprises water and a zinc degreasing detergent. The zinc plate is submerged in the bath for 1 to 2 minutes after which the zinc plate is rinsed in deionized water. The zinc plate remains in the water until the plating process is initiated.

The clean zinc plate is coated with indium by immersing the zinc plate in plating solution comprising water and indium sulfamate. The indium sulfamate is present in an amount sufficient so that the coating solution is a 1.6 molar solution of sulfamic acid and contains 28.8 gm of indium per liter of solution. The zinc plate is immersed in the plating solution for approximately 10 seconds, or until indium is present on the zinc plate 20 in an amount from about 500 to about 1000 parts indium per million parts zinc. The zinc plate is then removed from the coating solution, immediately rinsed in deionized water, and dried. After drying, the zinc plate 20 is ready for assembly into the full zinc anode 12.

The current collector 21 desirably is a sheet of silver foil having a thickness of about 1 mil. Generally, the current collector 21 comprises a metal which is capable of conducting electricity produced during discharge of the cell, but not being oxidized during discharge of the cell. Suitable metals for the current collector 21 in addition to silver include brass, copper, nickel, tin, and titanium. The current collector extends completely across the anode 12. The current collector 21 includes a lead 24 which projects through the cell case 18 when the cell 10 is assembled for connection to a load.

The current collector is attached to the indium-coated zinc plate using a hot-plate joining process. The hot-plates are set to a temperature above the melting point of the indium, but below the melting point of the zinc. This allows the indium to melt slightly, thereby creating good contact between the plate and the current collector, while eliminating the dead spots associated with other welding process, such as ultrasonic welding. However, if the temperature of the plates is above the melting point of the zinc, the zinc deforms and discolors and does not maintain a uniform thickness, density or porosity. Therefore, in general, the hot-plate press should be set at a temperature between about 160 and 410° C. Preferably, the temperature is about 285° C.

The indium-coated zinc plate and the current collector are passed through the hot-plate press under pressure and for a period of time sufficient to join the current collector to the zinc plate. The pressure exerted by the hot plates should be sufficient to create good contact between the plate and the electrode. In general, the pressure should be from about 750 to about 2000 psi. Preferably the pressure is about 1500 psi. The indium-coated zinc plate and the current collector should be pressed for a period of time sufficient to effectively join the current collector with the zinc plate. The actual length of time is determined by a variety of factors, including the thickness of the zinc plate. However. in general, the period of time should preferably be from about 1.5 to about 3 minutes and more preferably should be about 2 minutes.

While the present invention may be used to connect a current collector directly to a single indium-coated zinc plate, the preferred embodiment involves the formation of an anode comprising a current collector sandwiched between two indium-coated zinc plates, as discussed in greater detail below. In this embodiment, the current collector is placed between two indium-coated zinc plates and hot-plate joined such that the collector is connected to both of the plates. The same process parameters discussed above may be used to form the anode in this embodiment. Since the current collector is joined to both of the plates, this embodiment provides even better contact between the current collector and the zinc plates, thereby increasing the effectiveness of the anode.

The cathode 14 can be any cathode suitable for use in a metal-air electrochemical cell, but is desirably a porous sheet-type cathode including an active layer directly adhered to a gas-permeable, liquid-impermeable, wet proofing layer, as disclosed in U.S. Pat. Nos. 3,977,901, 5,306,579, and 5,506,067, the disclosures of which are expressly incorporated herein by reference. Generally described, however, the active layer of the cathode 14 forms the electrolyte side of the cathode, faces the electrolyte, and comprises catalyzed particles of activated carbon and particles of a hydrophobic polymer such as polytetrafluoroethylene. The wet proofing layer forms the air side of the cathode 14 and includes a mixture of carbon black particles and polytetrafluoroethylene particles. The cathode 14 further includes a metal current collector 26 which has a lead 28 extending therefrom for connection to a positive terminal for the cell 10. Suitable current collectors include fine mesh metal screens and expanded, perforated metal sheets made of non-corrosive metal such as nickel, tin or titanium.

A suitable electrolyte is an aqueous electrolyte including a Group I metal hydroxide such as LiOH, NaOH, KOH, CsOH, or the like. The electrolyte also desirably includes indium ions which can be added to the electrolyte in the form of a compound such as indium hydroxide. The indium helps prevent hydrogen gassing at the anode during discharge and storage. Preferably, the electrolyte includes indium in an amount from about 500 to about 1000 parts per million parts metal hydroxide. Less than 500 parts per million of indium in the electrolyte is not very effective and greater than about 1000 parts per million of indium in the electrolyte reduces the cycle life of the cell. A particularly suitable electrolyte includes 45% by weight potassium hydroxide, 6% by weight zinc oxide, 1000 parts indium hydroxide per million parts potassium hydroxide, and the remainder water.

The separator 16 disposed in the cell case 18 between the anode 12 and the cathode 14 separates the anode and cathode of the cell so that the electrodes do not come in direct electrical contact with one another and short circuit the cell. The separator 16 also absorbs and wicks electrolyte to keep electrolyte in contact with the electrodes. A suitable separator system is disclosed in U.S. Pat. No. 5,506,067, expressly incorporated herein by reference. Generally described, the separator 16 includes a plurality of layers of wettable and oxidation-resistant material such as nonwoven polymeric webs. The separator 16 allows the flow of electrolyte, but at least one layer of the separator retains the metallic ions and compounds from the anode 12 at the anode and separate from the other components of the metal-air cell.

The cell 10 also includes a pair of porous, absorbent webs 29A and 29B disposed on opposite sides of the anode 12 to wick electrolyte and contain the anode, especially after the first discharge cycle when the anode becomes a particulate cake. Suitable material for the absorbent webs 29A and 29B is a nylon fiber web available as Nylon #TR1113G from Hollingsworth & Vose of East Walpole, Mass. The absorbent webs and the separator package 16 form a barrier envelope surrounding the anode 12 to keep the zinc of the anode in the region of the anode current collector 21.

The cell case 18 comprises a rectangular, boxed-shaped or prismatic shell 30. The shell 30 comprises a substantially rectangular first member 32 and a substantially rectangular second member 34, both having the shape of a tray. The first member 32 is heat welded to the second member 34 along a single seam 36 to form the prismatic shape. The anode 12 is disposed proximate the first member 32 and the cathode 14 is disposed proximate the second member 34. Desirably, the case 18 is made of a material, such as polypropylene, that is lightweight and does not corrode when exposed to the electrolyte.

The first member 32 of the case shell 30 comprises a planar, rectangular anode panel 38 and four side walls 40 extending perpendicularly from the anode panel along the edges of the anode panel. As best shown in FIGS. 2 and 4, the first member 32 of the case shell 30 further includes a plurality of spacers 42 integral with and extending inwardly from the first member 32 of the case 18 about the periphery of the anode panel 38. The spacers 42 are spaced from one another and space the anode 12 of the cell 10 from the first member 32.

The anode panel 38 of the first member 32 has one or more gas vents 44 for releasing gas from the cell case 18. A suitable vent 44 is disclosed in U.S. Pat. No. 5,362,577, which is expressly incorporated herein by reference.

A rectangular support 46 fits about the interior of the cell case 18. The separator 16 and the cathode 14 extend within the rectangular support 46. A gas-permeable, liquid-impermeable membrane 48 fits tightly between the cell case 18 and the rectangular support 46. The membrane 48 extends across the air side of the cathode 14 and allows passage of air to and from the cathode, but seals electrolyte within the cell case 18. A suitable material for the membrane 48 is CELGARD® 2400 microporous polypropylene membrane available from Hoechst Celanese Corporation of Charlotte, N.C.

As best shown in FIG. 2, the second member 34 of the case shell 30 comprises a rectangular cathode panel 50 and four side walls 52 extending perpendicularly from edges of the cathode panel. The cathode panel 50 includes a mask member 54 which extends over and is spaced from the air cathode 14. The second member 34 of the case 18 has a peripheral shoulder 56 surrounding the mask member 54 and defining an opening 58 for receiving and releasing gas from the cell case 18 through the cathode 14. The mask member 54 and the remainder of the second member 34 of the case 18 form a housing defining an air plenum 60 adjacent the cathode 14. The mask member 54 has a plurality of openings 62 for allowing a sufficient amount of air to the cathode 14 through the opening 58 adjacent the cathode for adequate power production from the cell, but limiting the exposure of the air cathode to air to minimize exposure of the air cathode to moisture and contaminates and thereby prevent premature failure from flooding, drying out, or contamination. A suitable mask member is disclosed in U.S. Pat. No. 5,328,777, the disclosure of which is expressly incorporated herein by reference.

Desirably, the metal-air electrochemical cell 10 is a rechargeable cell and has two modes of operation. The first mode is the discharge mode in which oxygen from the air plenum is consumed at the air cathode 14 and electricity is produced. The second mode is the recharge mode in which oxygen is produced at the cathode 14 and released into the air plenum 60 and electrical energy is stored. During the first discharge/recharge cycle of the metal-air cell 10 containing the undischarged non-particulate anode 12, the zinc metal plate 20 is oxidized on discharge to metal oxides or metal ions and, on electrical recharge, is reformed as a cake of particulate zinc metal with the indium from the indium coating on the anode plate dispersed throughout the anode cake.

The particulate anode 10 shown in FIG. 4 is the same as the non-particulate metal anode shown in FIG. 1 except that the zinc metal plate 12 has been reformed by electrically recharging into a cake of particulate zinc. Thus, like reference numerals are used to reference like parts in FIGS. 2 and 4.

Although the cell 10 described above has one cathode 14 and one anode 12, the indium-coated anode can also be used in a dual electrode metal-air cell as is disclosed in U.S. Pat. No. 5,569,551, the disclosure of which is expressly incorporated herein in its entirety. The metal-air cell disclosed in U.S. Pat. No. 5,569,551 includes a pair of air cathodes disposed in a cell case, and an anode comprising a single current collector sandwiched between a pair of zinc plates and disposed in the cell case between the two cathodes. The air cathodes are spaced from respective sides of the anode and are separated from the anode by separator packages like the separator 16 of the cell 10 described herein. The case includes a pair of masks, one adjacent each cathode, and each mask forms a cathode plenum adjacent the respective cathode. The anode in this embodiment is a dual anode comprising a pair of non-particulate metal zinc plates, like the zinc plate 20 in the single anode cell 10, and a silver foil current collector sandwiched between the zinc plates. Each of the zinc plates is made of non-particulate, mercury-free, indium-coated zinc. The hot-plate joining process is operated under the same parameters as for the single anode discussed above. The hot-plates are set to a temperature above the melting point of the indium, but below the melting point of the zinc. Preferably, the temperature is from about 160 to about 410° C. Preferably, the temperature is about 285° C. Additionally, the pressure should be from about 750 to about 2000 psi. Preferably the pressure is about 1500 psi.

It should be understood that the foregoing relates to particular embodiments to the present invention, and that numerous changes may be made therein without departing from the scope of the invention as defined by the following claims.

We claim:

1. An anode for use in an electrochemical cell comprising:
   a plate of non-particulate, mercury-free zinc metal having a surface;
   a coating of indium metal on at least a portion of the zinc plate surface; and
   a current collector in electrical contact with at least a portion of the indium coating of the indium-coated zinc plate.

2. An anode as in claim 1 wherein the zinc plate is a sheet of expanded perforated metal.

3. An anode as in claim 1 wherein the indium coating is deposited on the zinc metal plate surface by electroless immersion plating.

4. An anode as in claim 1 wherein the indium is present in the anode in an amount from about 500 to about 1500 parts per million parts zinc.

5. An anode as in claim 1, wherein the current collector is joined to the indium-coated zinc plate at a temperature sufficient to at least partially melt the coating of indium metal while not melting the zinc whereby the contact between the current collector and the indium-coated zinc plate is established in the absence of any weld spots.

6. A rechargeable metal-air electrochemical cell comprising:
   a case having an opening for receiving and releasing gas through the case;
   an air cathode disposed in the case adjacent the opening;
   an anode disposed in the case and comprising a plate of non-particulate mercury-free zinc metal having a surface and a coating of indium metal on at least a portion of the zinc plate surface; and
   an aqueous liquid electrolyte disposed in the case and contacting the air cathode and the anode.

7. A rechargeable metal-air cell as in claim 6 wherein the electrolyte comprises indium ions.

8. A rechargeable metal-air cell as in claim 6 wherein the electrolyte comprises indium hydroxide.

9. A rechargeable metal-air cell as in claim 6 wherein the electrolyte comprises a Group IA metal hydroxide and indium ions.

10. A rechargeable metal-air cell as in claim 6 wherein the electrolyte comprises a Group IA metal hydroxide and indium ions in an amount from about 500 to about 1000 parts per million parts Group IA metal hydroxide.

11. A rechargeable metal-air cell as in claim 6 wherein the zinc plate is a sheet of expanded perforated metal.

12. A rechargeable metal-air cell as in claim 6 wherein the indium coating is deposited on the zinc metal plate surface by electroless immersion plating.

13. A rechargeable metal-air cell as in claim 6 wherein the indium is present in the anode in an amount from about 500 to about 1500 parts per million parts zinc.

14. A rechargeable metal-air cell as in claim 6 wherein:
   the electrolyte comprises a Group IA metal hydroxide and indium ions in an amount from about 500 to about 1000 parts per million parts Group IA metal hydroxide; and
   the indium is present in the anode in an amount from about 500 to about 1500 parts per million parts zinc.

15. A process for making a zinc anode for use in an electrochemical cell comprising the steps of:
   discharging an electrochemical cell comprising an undischarged anode to form a discharged anode, the undischarged anode including a plate of non-particulate, mercury-free zinc metal having a surface, and a coating of indium metal on at least a portion of the zinc plate surface; and
   electrically recharging the cell whereby the discharged anode is reformed as a porous cake comprising zinc particles and indium metal dispersed in the cake.

16. A process as in claim 15 wherein the electrochemical cell is a metal-air cell.

17. A process as in claim 16 wherein the metal-air cell includes:
   a case having an opening for receiving and releasing gas through the case;
   an air cathode disposed in the case adjacent the opening; and
   an aqueous liquid electrolyte disposed in the case and contacting the air cathode and the anode.

18. A process as in claim 17 wherein the electrolyte comprises indium ions.

19. A process as in claim 17 wherein the electrolyte comprises indium hydroxide.

20. A process as in claim 17 wherein the electrolyte comprises a Group IA metal hydroxide and indium ions.

21. A process as in claim 17 wherein the electrolyte comprises a Group IA metal hydroxide and indium ions in an amount from about 500 to about 1000 parts per million parts Group IA metal hydroxide.

22. A process as in claim 15 wherein the zinc plate is a sheet of expanded metal.

23. A process as in claim 15 wherein the indium coating is deposited on the zinc metal plate surface by electroless immersion plating.

24. A process as in claim 15 wherein the indium is present in the anode in an amount from about 500 to about 1500 parts per million parts zinc.

25. A process as in claim 17 wherein:
   the electrolyte comprises a Group IA metal hydroxide and indium ions in an amount from about 500 to about 1000 parts per million parts Group IA metal hydroxide; and
   the indium is present in the anode in an amount from about 500 to about 1500 parts per million parts zinc.

26. A zinc anode for use in an electrochemical cell made according to a process comprising the steps of:
   discharging an electrochemical cell comprising an undischarged anode to form a discharged anode, the undischarged anode including a plate of non-particulate, mercury-free zinc metal having a surface, and a coating of indium metal on at least a portion of the zinc plate surface; and
   electrically recharging the cell whereby the discharged anode is reformed as a porous cake comprising zinc particles and indium metal dispersed in the cake.

27. An anode as in claim 24 wherein the electrochemical cell is a metal-air cell.

28. An anode as in claim 25 wherein the metal-air cell includes:
   a case having an opening for receiving and releasing gas through the case;
   an air cathode disposed in the case adjacent the opening; and
   an aqueous liquid electrolyte disposed in the case and contacting the air cathode and the anode.

29. An anode as in claim 28 wherein the electrolyte comprises indium ions.

30. A process for making a zinc anode for use in an electrochemical cell comprising the steps of:
   applying a coating of indium metal to at least a portion of a surface of a zinc metal plate; and
   joining a current collector to the indium-coated zinc plate,
   wherein the current collector is joined to the indium-coated zinc plate at a temperature sufficient to at least partially melt the coating of indium metal while not melting the zinc such that contact between the current collector and the indium-coated zinc plate is produced in the absence of any weld spots.

31. A process as in claim 30 wherein the zinc plate comprises a non-particulate, mercury-free zinc metal plate.

32. A process as in claim 31 further comprising the steps of:
   discharging an electrochemical cell comprising an undischarged anode to form a discharged anode, the undischarged anode comprising the plate of non-particulate, mercury-free zinc metal having a coating of indium metal on at least a portion of the zinc metal plate surface; and
   electrically recharging the cell whereby the discharged anode is reformed as a porous cake comprising zinc particles and indium metal dispersed in the cake.

33. A process as in claim 32 wherein the electrochemical cell is a metal-air cell.

34. A process as in claim 30 wherein the current collector comprises a sheet of silver foil.

35. A process as in claim 30 wherein the current collector is joined to the indium-coated zinc plate using a hot-plate press.

36. A process as in claim 35 wherein the hot-plate press is operated at a temperature of from about 160 to about 410° C.

37. A process as in claim 35 wherein the hot-plate press is operated at a pressure of from about 750 to about 2000 psi.

38. A process as in claim 35 wherein the hot-plate press is operated for a period of time from about 1.5 to about 3 minutes.

39. A process as in claim 30 wherein the zinc metal plate is a sheet of expanded metal.

40. A process as in claim 30 wherein the indium coating is deposited on the zinc metal plate surface by electroless immersion plating.

41. A process as in claim 30 wherein the indium is present in the anode in an amount from about 500 to about 1500 parts per million parts zinc.

42. A process as in claim 30 further comprising:

applying a coating of indium metal to at least a portion of a second zinc metal plate; and placing the current collector between the indium-coated zinc metal plates and joining the current collector to the indium-coated zinc metal plates.

43. A zinc anode for use in an electrochemical cell made according to a process comprising the steps of:

applying a coating of indium metal to at least a portion of a surface of a zinc metal plate; and joining a current collector to the indium-coated zinc plate, wherein the current collector is joined to the indium-coated zinc plate at a temperature sufficient to at least partially melt the coating of indium metal while not melting the zinc such that contact between the current collector and the indium-coated zinc plate is produced in the absence of any weld spots.

44. An anode as in claim 43 wherein the electrochemical cell is a metal-air cell.

45. An anode as in claim 43 wherein the zinc metal plate is a sheet of expanded perforated metal.

46. An anode as in claim 43 wherein the indium coating is deposited on the zinc metal plate surface by electroless immersion plating.

47. An anode as in claim 43 wherein the indium is present in the anode in an amount from about 500 to about 1500 parts per million parts zinc.

48. An anode as in claim 43 wherein the zinc plate comprises a non-particulate, mercury-free zinc metal plate.

49. An anode as in claim 48 wherein the process further comprises the steps of:

discharging an electrochemical cell comprising an undischarged anode to form a discharged anode, the undischarged anode comprising the plate of non-particulate, mercury-free zinc metal having a coating of indium metal on at least a portion of the zinc metal plate surface; and electrically recharging the cell whereby the discharged anode is reformed as a porous cake comprising zinc particles and indium metal dispersed in the cake.

50. An anode as in claim 43 wherein the current collector comprises a sheet of silver foil.

51. An anode as in claim 43 wherein the current collector is joined to the indium-coated zinc plate using a hot-plate press.

52. An anode as in claim 51 wherein the hot-plate press is operated at a temperature of from about 160 to about 410° C.

53. An anode as in claim 51 wherein the hot-plate press is operated at a pressure of from about 750 to about 2000 psi.

54. An anode as in claim 51 wherein the hot-plate press is operated for a period of time from about 1.5 to about 3 minutes.

55. An anode as in claim 43 wherein the process further comprises the steps of:

applying a coating of indium metal to at least a portion of a second zinc metal plate; and placing the current collector between the indium-coated zinc metal plates and joining the current collector to the indium-coated zinc metal plates.

\* \* \* \* \*

UNITED STATES PATENT AND TRADEMARK OFFICE
CERTIFICATE OF CORRECTION

PATENT NO. : 6,221,530 B1
DATED : April 24, 2001
INVENTOR(S) : Turner et al.

It is certified that error appears in the above-identified patent and that said Letters Patent is hereby corrected as shown below:

<u>Title page, Item [54] and Column 1, line 2,</u>
Title, "ELECTROMECHANICAL" should read -- ELECTROCHEMICAL --.

<u>Column 10,</u>
Line 29, "claim 24" should read -- claim 26 --;
Line 31, "claim 25" should read -- claim 27 --.

Signed and Sealed this

Tenth Day of September, 2002

*Attest:*

*Attesting Officer*

JAMES E. ROGAN
*Director of the United States Patent and Trademark Office*